United States Patent [19]

Bernat, Georg

[11] Patent Number: 4,880,209
[45] Date of Patent: Nov. 14, 1989

[54] SEALING WASHER FOR TAPS
[75] Inventor: Bernat, Georg, Narre Warren, Australia
[73] Assignee: Dorf Industries Pty. Ltd., Victoria, Australia
[21] Appl. No.: 231,394
[22] Filed: Aug. 12, 1988
[30] Foreign Application Priority Data Aug. 14, 1987 [AU] Australia .................. PI3746

[51] Int. Cl.⁴ .............................. F16K 25/00
[52] U.S. Cl. .......................... 251/363; 137/454.5; 137/614.2
[58] Field of Search ............. 137/614.2, 625.31, 454.5; 251/363

[56] References Cited
U.S. PATENT DOCUMENTS

| 3,389,717 | 6/1968 | Povalski et al. | 137/454.5 |
| 4,006,883 | 2/1977 | Hilsheimer | 251/363 |
| 4,064,904 | 12/1977 | Tolnai | 137/454.5 |
| 4,474,208 | 10/1984 | Looney | 251/363 |

FOREIGN PATENT DOCUMENTS

| 4030685 | 3/1986 | Australia . | |
| 5827486 | 6/1986 | Australia . | |
| 3619499 | 12/1986 | Fed. Rep. of Germany | 137/454.5 |

Primary Examiner—A. Michael Chambers
Attorney, Agent, or Firm—Birch, Stewart, Kolasch & Birch

[57] ABSTRACT

A sealing washer for a tap top assembly of the type including an end housing containing a ceramic disc assembly, and for engagement with a valve seat within a tap body with the sealing washer normally engaging said ceramic disc assembly. The sealing washer is comprised of a ring of resilient compressible material surrounded by a sleeve of rigid material positioned whereby, in use, upon excessive compression of said resiliently compressible material a circumferentially extending flange on the sleeve will engage the end of the housing containing the ceramic disc assembly to retransmit the excessive compressive forces to the housing rather than the ceramic disc assembly. The radially inward side of the sealing ring has a circumferentially extending groove which, as fluid pressure increases, the force supplied on the underface formed by the groove increases proportionally to increase the sealing force of the ring against the ceramic disc assembly, while with decreasing fluid pressure, the sealing pressure decreases accordingly, thus ensuring that the sealing force at any time is only as much as is necessary to ensure adequate sealing.

4 Claims, 1 Drawing Sheet

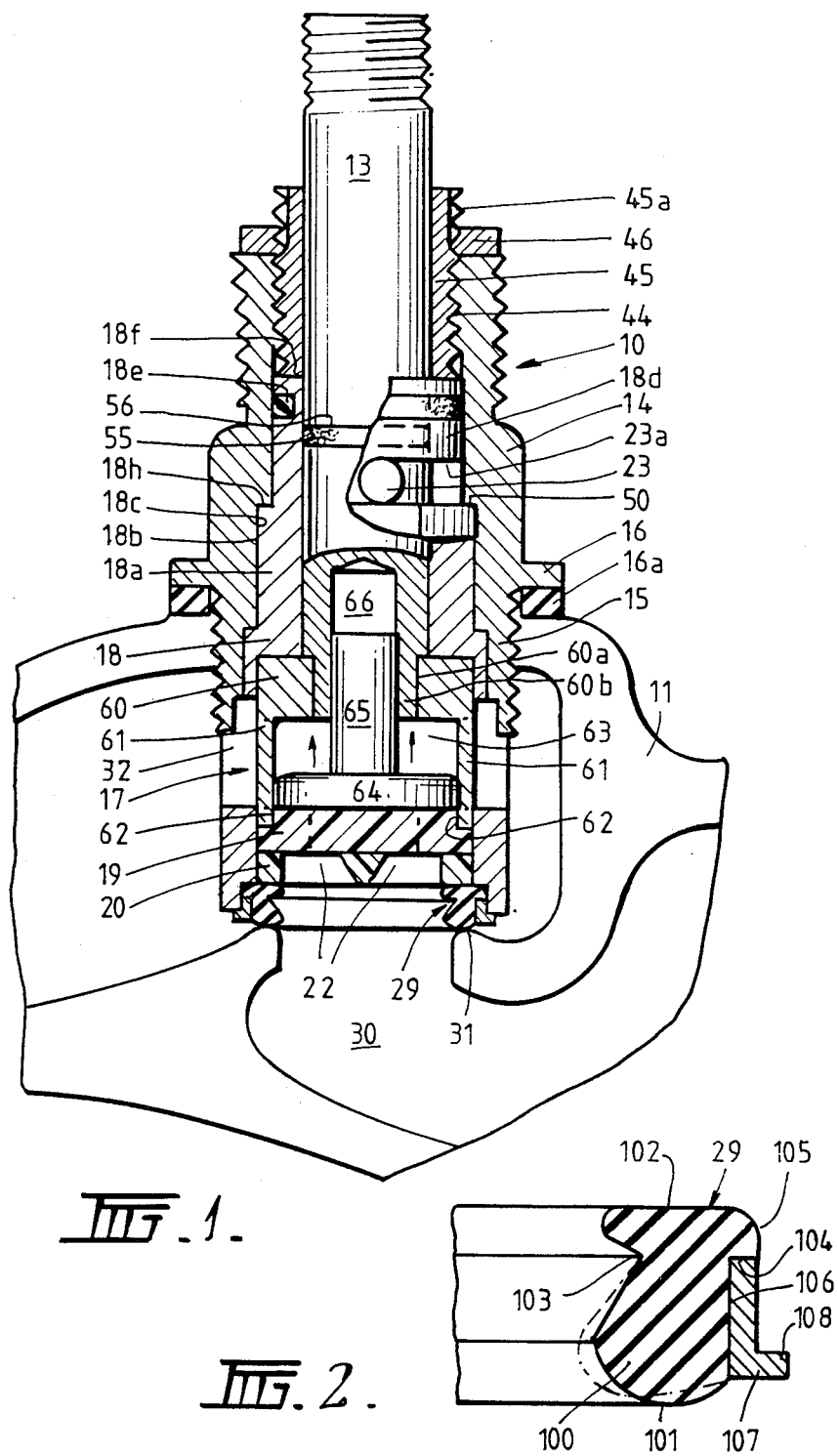

SEALING WASHER FOR TAPS

TECHNICAL FIELD

This invention relates to a sealing washer for taps, and more particularly, a sealing washer for taps of the type where only part of a full rotation of the tap spindle is necessary to facilitate full opening of the tap from a closed condition, usually a quarter or 90° turn, although the present invention is not restricted to application to such taps and includes 180° turn taps.

BACKGROUND ART

In some taps of the quarter turn type referred to above, an arrangement of discs, usually of ceramics, incorporating apertures therethrough has been proposed. Adjacent faces of the discs are mounted to abut each other such that rotation of one of the discs relative to the other brings the apertures through the respective discs into and out of alignment to allow operation of the tap between fully opened and fully closed conditions with only a part turn of the tap spindle, namely through 90° (quarter turn). A tap of the above general type is disclosed in the specifications of U.S. Pat. No. 4,738,277 and U.K. Pat. No. 2,159,925.

As discussed in the specifications of the aforementioned patent applications, in order to meet the standards set down by water supply authorities, including Australian water supply authorities, and with which taps must comply, the distance between the outer surface surrounding the access opening to the interior of a tap body within which a tap top assembly is to be inserted, to the valve seat within the body, has a value within specified tolerances, and thus, as the inner end of the assembly is required to permanently seat in sealing engagement with the valve seat within the tap body, the corresponding length of the tap top assembly must comply with the specified distance. However, the allowable tolerances can lead to a situation where the relevant length of the tap top assembly may be less than the specified distance for the tap body thus preventing proper sealing engagement with the valve seat in the tap body, or if longer, preventing proper sealing of the tap top assembly with the tap body around the access opening within which the assembly is received.

It is also desirable that tap top assemblies be provided as replacements for tap top assemblies in existing tap bodies so as to enable conversion of an existing tap to a quarter turn tap, and thus the relevant dimensions may not be such as to ensure proper sealing engagement of the tap top assembly in the existing tap body.

In the specifications of both the aforementioned patent applications provision is made to ensure that the inner end of the tap top assembly firmly seats on the valve seat within the tap body and also that proper sealing is achieved between the tap top assembly around the access opening through the valve seat.

Both the assemblies of the specifications of the aforementioned patent applications allow for firm engagement of the inner end of the tap top assembly with the valve seat within the tap body as an initial step in the positioning of the tap top assembly, and as a result have been subject to the problem that during installation, or in subsequent servicing, greater pressure than necessary has been applied to the sealing washer on the end of the tap top assembly such that the washer has been compressed to the extent that the pressure has been transmitted to the disc arrangement against which the washer bears, and which may result in damage to the ceramic discs and therefore cause leakage through the disc assembly and/or failure of the disc assembly to function properly. In addition, if excessive pressure if applied to the ceramic disc assembly, two other effects can result, namely the lubricating medium between the discs may be forced out thus resulting in high friction and greater wear and/or higher operating torque being necessary through the tap spindle.

DISCLOSURE OF THE INVENTION

It is therefore an object of the present invention to provide a sealing washer for tap top assembly of the type referred to above which will withstand high compressive pressures between the valve seat within the tap body and the end of the tap top assembly such as not to damage the ceramic disc assembly.

Therefore, according to the invention, there is provided a sealing washer, for the end of a tap top assembly of the type including an end housing containing a ceramic disc assembly, and for engagement with a valve seat within a tap body, said sealing washer normally engaging said ceramic disc assembly and comprising a ring of resiliently compressible material surrounded by a sleeve of rigid material positioned whereby, in use, upon excessive compression of said resiliently compressible material part of said sleeve will engage the end of said housing containing the ceramic disc assembly to retransmit the excessive compressive forces to said housing rather than said ceramic disc assembly.

BRIEF DESCRIPTION OF THE DRAWINGS

One embodiment of the invention, as applied to quarter turn ceramic disc type tap top assembly, will now be described with reference to the accompanying drawings, in which:

FIG. 1 is a partially sectioned view of a tap top assembly, incorporating a sealing washer in accordance with a preferred embodiment of the present invention, and received within a tap body; and FIG. 2 is an enlarged cross-sectional view through the sealing washer incorporated within the tap top assembly of FIG. 1.

BEST MODE FOR CARRYING OUT THE INVENTION

Turning to FIG. 1 of the drawings, there is shown a tap top assembly, generally indicated as 10, inserted within a tap body 11. The tap top assembly includes a tap spindle 13, to which a handle (not shown) is applied, and which is received through a closure member 14 having an externally threaded extension 15 threadably received within an access opening in the tap body, whilst a sealing washer 16a is interposed between a flange 16 on the closure member and the surface of the tap body surrounding the access opening.

The tap top assembly further comprises a ceramic disc assembly, generally indicated as 17, and which may be a commercially available assembly, comprising a pair of ceramic discs 19 and 20 the faces of which are in abutting relationship. The upper ceramic disc 19 has a pair of diametrically opposed V-shaped cut-outs formed therein which, when rotated relative to the other disc 20 which is fixed within the housing, align with apertures 22 through the fixed disc 20 shaped as quadrants of circles and to allow fluid flow therethrough, and such that, upon rotation through 90°, or a quarter turn, the cut-outs progressively move out of alignment with the apertures 22 to progressively reduce fluid flow through the assembly until they move out of complete alignment at the end of 90° of rotation and thus prevent fluid flow through the assembly. The ceramic disc assembly is received within a housing 18 with the tap spindle 13 extending through an extension 18a of the housing. An "O" ring 55 within a groove 56 around the spindle provides a fluid seal between the spindle 13 and the housing 18. In order to confine the limits of 90° of rotation, the The tap spindle 13 has radially outwardly extending pin 23, which, when the assembly is in the open position, engages one end of an arcuate slot 23a formed around and through the wall of a housing extension 18a and subtending an angle of in the order of 90°. Upon rotation of the spindle to move the upper ceramic disc 19 to a position where the cut-outs and apertures are out of alignment, the pin 23 engages an opposite end of the arcuate slot 23a. With reference to FIG. 3 of the drawings, the housing extension 18a has a hexagonal outer surface portion 18b which engages with a similarly shaped internal surface 18c within the closure member 14 to locate and hold the housing against rotation within the member 14. The housing extension 18a terminates in a cylindrical portion 18d with a sealing O-ring 18e and an annular end face 18f.

The closur member 14 has an internal threaded portion 44 in its outer end which receives an externally threaded adjustment nut 45 surrounding the tap spindle 13 and having diametrically opposed flats 45a formed thereon for finger or spanner adjustment.

With reference to FIG. 1 of the drawings, prior to insertion within the tap body, the internal assembly of the tap top assembly is shifted axially within the closure member 14 until the upper end face 18h of the housing for ceramic discs approaches or engages a step 50 within the closure member, and the threaded section 15 on the closure 14 of the assembly is screwed into position within the access opening of the tap body as shown in FIG. 1 and with a sealing washer 29 at the end of the space from a valve seat 31 within the tap body. The adjustment nut 45 is then screwed inwards of the closure member until its end engages the annular end face 18f of the housing extension 18a, and on further inward screwing of the adjustment nut the internal assembly shifts axially downwardly within the closure member 14 until the sealing washer 29 on the end of the assembly moves into tight sealing engagement with the valve seat 31. It will be apparent that by virtue of the adjustment nut 45 the assembly provides for variations in the distance between the outer surface surrounding the access opening to the interior of the tap body and the valve seat 31. The adjustment nut 45 is then locked into position by a lock nut 46 threadable received about the adjustment nut and screwed into a locking position whereby it engages against the upper end of the closure member 14 to lock the adjustment nut against axial movement within the closure member.

The rotation of the spindle 13 is transmitted to the upper closure disc 19 via a centrally disposed drive member 60 which includes diametrically opposed downwardly extending lugs 61 which engage within diametrically opposed recesses 62 in the peripheral edge of the upper ceramic disc 19.

The drive member 60 has a central square shaped aperture 60a which receives a mating square shaped formation 60b on the end of the spindle 13, whereby rotation of the spindle is transmitted to the drive member 60 and, via the lugs 61, to the upper ceramic disc 19 to open and close the tap assembly.

A chamber 63 is defined between the drive member 60 and the upper ceramic disc 19, and a jumper valve 64 is positioned in that chamber with its stem 65 slidably received within a blind hole 66 in the end of the spindle 13. The pressure of fluid entering the ceramic disc assembly through the valve seat in an associated tap body lifts the jumper valve 64 off the ceramic disc assembly as shown by the arrows in FIG. 1 whereby the fluid can flow through the disc assembly when open and outwardly thereof through apertures 32 in the wall of the housing 18 and then to the outlet from the tap body. When the fluid pressure at the outlet exceeds that on the inlet side, the jumper valve is forced downwardly within the chamber 63 and against the upper ceramic disc 19, as shown in FIG. 1, to close the apertures through the disc to prevent flow back of fluid through the tap top assembly.

In some installations where the assembly needs to be lengthened, and to allow for standardization of the sizes of the adjustment nut and the control means, a sleeve member may be provided surrounding the tap spindle 13 and interposed between the inner end of the adjustment nut 45 and the annular end face 18f.

The tap top assembly as described above conforms with that the subject of FIG. 10 of our aforementioned patent application No. 58274/86, but the sealing washer 29 is modified in accordance with that of the present invention. As with the sealing ring of application No. 58274/86 and also our aforementioned patent application No. 40306/85, the sealing washer 29 is in the form of an annular ring 100 of a resiliently compressible material. However in accordance with the preferred embodiment of the present invention, the sealing washer 29 has an annular outer curved face 101 adapted to engage the valve seat 31 within the tap body and an inner annular substantially flat face 102 adapted to engage the fixed disc 20 of the disc assembly. The radially inward side of the ring 29 has a circumferentially extending V-shaped groove 103 formed therein, whilst the radially outward side has a step 104 formed therein to provide a large diameter portion 105 adjacent the fixed disc 20 and a smaller diameter portion 106 adjacent the valve seat 31. Positioned around the smaller diameter portion 106 and abutting the step 104 is a sleeve 107 of rigid material, such as a metal, and which has a circumferentially extending flange 108 at the end adjacent the valve seat. Alternatively the ring 100 and the sleeve 107 may be formed as an integral component by overmoulding the ring 100 with the sleeve 107. The effect of V-shaped groove 103 is such that as it is exposed to fluid pressure, as fluid pressure increases the force applied on the underface formed by the groove increases proportionally to increase the sealing force of the sealing ring against the ceramic disc 20, whilst with decreasing pressure the sealing force decreases accordingly, thus ensuring that the sealing force at any time is only as much as is necessary to ensure adequate sealing.

Upon application of a compressive force on the washer between the valve seat 31 and the fixed disc 20 during installation of the tap top assembly within the tap body, the annular ring 100 of resiliently compressible material will progressively deform to a condition as shown in dotted lines in FIG. 2, and under excessive compression will deform sufficiently for the flange 108 of the sleeve 107 to engage the end of the housing 18 which thereafter bears the increasing compressive forces which would normally be applied to, and may damage, the ceramic disc assembly 19, 20. With the sealing washer of the present invention, if compressed to a degree higher than that normally required to fulfill its sealing function, the possibility that damage to the ceramic disc assembly 19, 20 might occur is avoided, and if the sealing washer becomes damaged, deformed or deteriorates to any extent, it can be merely replaced. In addition, by relieving the ceramic disc assembly from excessively high pressures due to over compression of the sealing washer, high frictional forces generated between the discs are avoided and excessive wear, and/or the application of an excessive operating torque at the tap spindle, are avoided.

The claims defining the invention are as follows:

I claim:

1. A sealing washer, for the end of a tap top assembly of the type including an end housing containing a ceramic disc assembly, and for engagement with a valve seat within a tap body, said sealing washer normally engaging said ceramic disc assembly and comprising a ring of resilient compressible material surrounded by a sleeve of rigid material with a radially outwardly extending flange forming part of said sleeve and positioned whereby, in use, upon excessive compression of said resiliently compressible material said flange will engage the end of said housing containing the ceramic disc assembly to retransmit the excessive compressive forces to said housing rather than said ceramic disc assembly.

2. A sealing washer as claimed in claim 1, wherein said ring has an outer curved face adapted to engage said valve seat and an annular substantially flat face adapted to engage the disc assembly.

3. A sealing washer as claimed in claim 1 or 2, wherein the radially inward side of said sealing ring has a circumferentially extending groove which, as fluid pressure increases, the force supplied on the underface formed by the groove increases proportionally to increase the sealing force of said ring against the ceramic disc assembly, whilst with deceasing fluid pressure, the sealing pressure decreases accordingly, thus ensuring that the sealing force at any time is only as much as is necessary to ensure adequate sealing.

4. A tap top assembly incorporating a sealing washer as claimed in claim 1, 2 or 3.

* * * * *